UNITED STATES PATENT OFFICE 2,462,405

STILBENE BIS TRIAZOLE AZO DYESTUFFS

Ernst Keller and Reinhard Zweidler, Basel, Switzerland, assignors to J. R. Geigy A.-G., Basel, Switzerland, a Swiss firm No Drawing. Application November 27, 1945, Serial No. 631,224. In Switzerland November 24, 1944

10 Claims. (Cl. 260—143)

It has been found that valuable new stilbene dyestuffs are obtained, if iso- or heterocyclic amines including also aminoazo dyestuffs are condensed in an alkaline solution with nitrostilbene-bis-triazols of the probable general formula

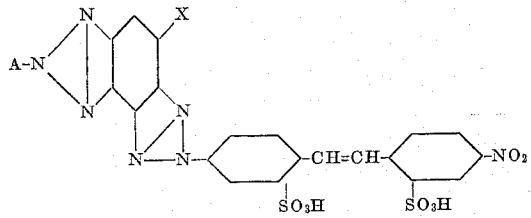

wherein A means a benzene or naphthalene radical with at least one solubilising group, such as a COOH- or SO₃H-group, which radical may still further be substituted, and X means hydrogen or an alkyl, alkoxy, sulfonic acid or carboxylic group or halogen.

The stilbene-bis-triazols not known heretofore may advantageously be prepared for instance by coupling 4-nitro-4'-diazo-stilbene-2:2'-disulfonic acid with 5-amino-2-aryl-1:3-benztriazols and oxidising the coupling products by means of suitable oxidising agents thus giving the bis-triazols. As oxidising agent may be enumerated for example cupric salts in an alkaline solution, lead peroxide, manganese dioxide, eventually also sodium hypochlorite and the like. The new stilbene-bis-triazols obviously must be formulated as angular bis-triazols. As proved by P. Schmidt and A. Hagenböcker (Berichte der deutschen chemischen Gesellschaft 54, 2201) as well as by K. Fries and G. Walnitzki (Annalen der Chemie 511, 267) 5-amino-2-phenyl-1:3-benztriazols

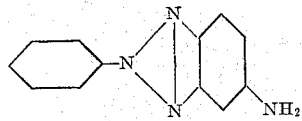

couple in 4-position; thus, when oxidising the azo dyestuff from diazobenzene and 5-amino-2-phenyl-1:3-benztriazol, the bis-(2-phenyl-1:2:3-triazolo)-benzene of the following formula is produced:

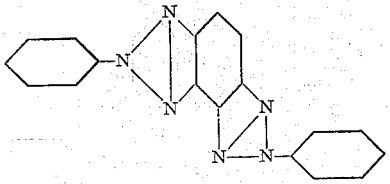

In view of the foregoing the new stilbene-bis-triazols claimed herein certainly correspond to the above formulated general formula having an angular tricyclus and this particularly, since the same may also be prepared, when the 6-position of the benztriazol is occupied.

Among the great number of stilbene-bis-triazols, which may be used as condensation components, the following ones may be enumerated for example only, these compounds being obtainable by coupling 4-nitro-4'-diazostilbene-2:2'-disulfonic acid (St) with 5-amino-2-aryl-1:3-benztriazols and oxidising the azo dyestuff.

(1)
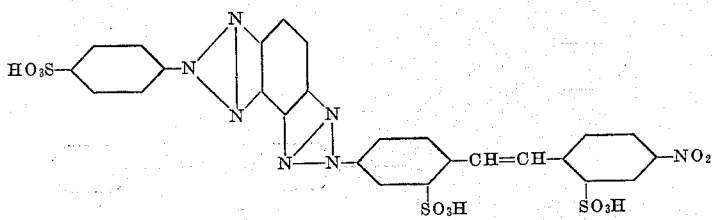

From St ⟶ 5-amino-2-(4'-sulfophenyl)-1:3-benztriazol (2)
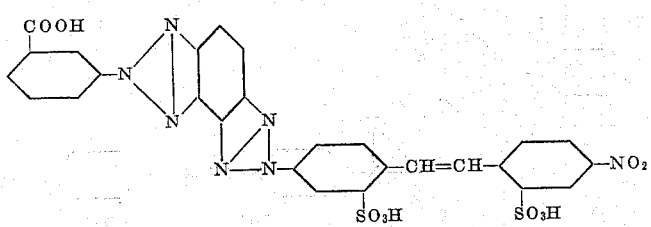

From St ⟶ 5-amino-2-(3'-carboxyphenyl)-1:3-benztriazol (3) 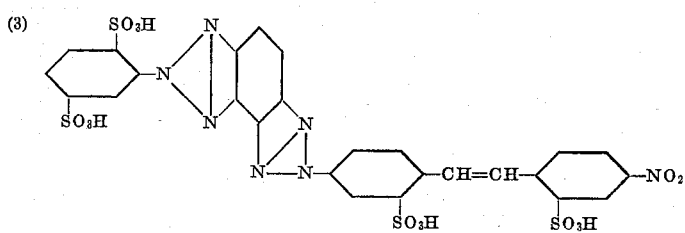

From St ⟶ 5-amino-2-(2':5'-disulfophenyl)-1:3-benztriazol (4) 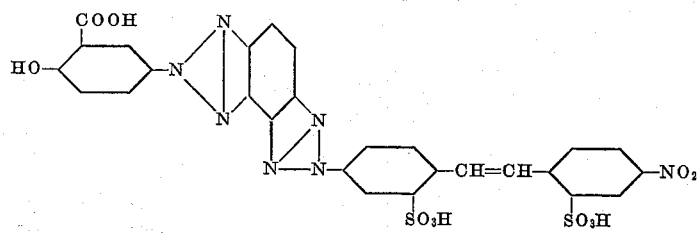

From St ⟶ 5-amino-2-(4'-hydroxy-3'-carboxyphenyl)-1:3-benztriazol (5) 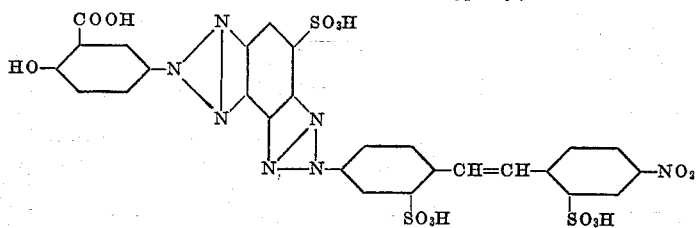

From St ⟶ 5-amino-2-(4'-hydroxy-3'-carboxyphenyl)-1:3-benztriazol-6-sulfonic acid (6) 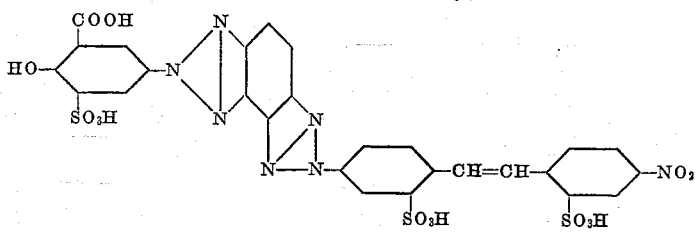

From St ⟶ 5-amino-2-(4'-hydroxy-3'-carboxy-5'-sulfophenyl)-1:3-benztriazol (7) 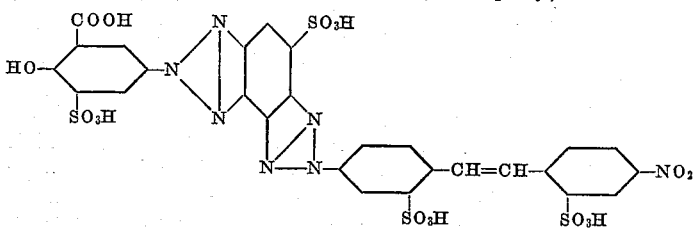

From St ⟶ 5-amino-2-(4'-hydroxy-3'-carboxy-5'-sulfophenyl)-1:3-benztriazol-6-sulfonic acid (8) 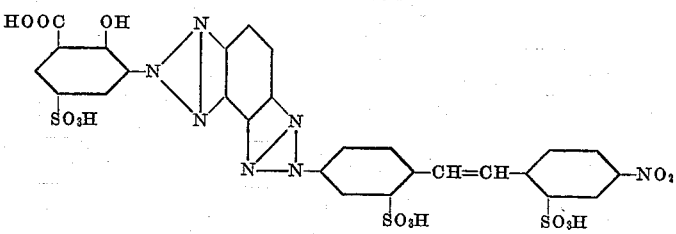

From St ⟶ 5-amino-2-(2'-hydroxy-3'-carboxy-5'-sulfophenyl)-1:3-benztriazol (9) 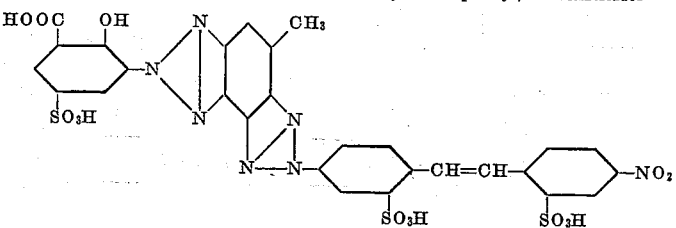

From St ⟶ 5-amino-2-(2'-hydroxy-3'-carboxy-5'-sulfophenyl)-6-methyl-1:3-benztriazol

(10) 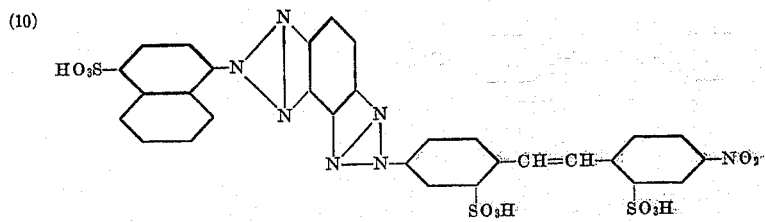

From St ⟶ 5-amino-2:1'-(4'-sulfonaphthyl)-1:3-benztriazol

(11) 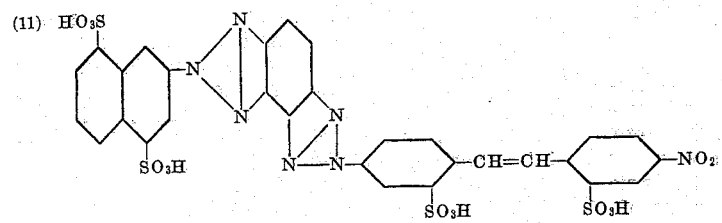

From St ⟶ 5-amino-2:2'-(4':8'-disulfonaphthyl)-1:3-benztriazol

(12) 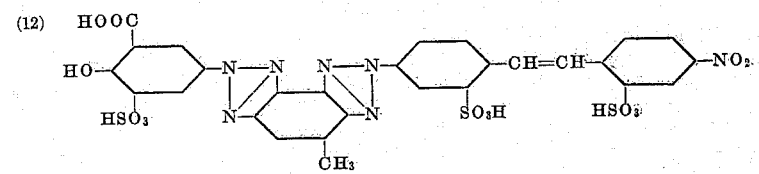

From St ⟶ 5-amino-2-(4'-hydroxy-3'-carboxy-5'-sulfophenyl)-6-methyl-1:3-benztriazol

(13) 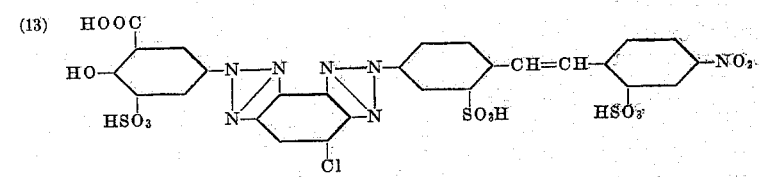

From St ⟶ 5-amino-2-(4'-hydroxy-3'-carboxy-5'-sulfophenyl)-6-chloro-1:3-benztriazol

(14) 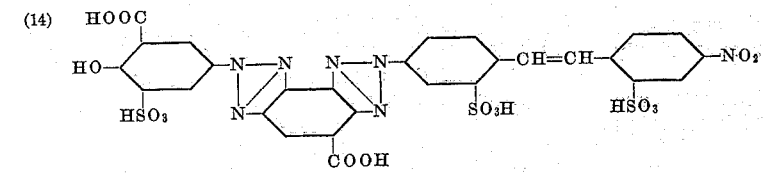

From St ⟶ 5-amino-2-(4'-hydroxy-3'-carboxy-5'-sulfophenyl)-6-carboxy-1:3-benztriazol

(15) 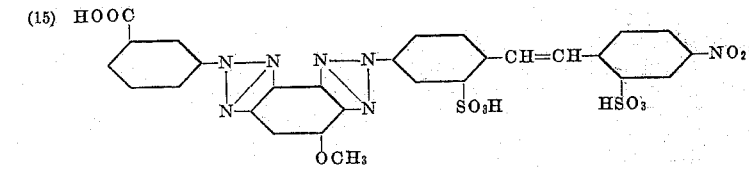

From St ⟶ 5-amino-2-(3'-carboxyphenyl)-6-methoxy-1:3-benztriazol

(16) 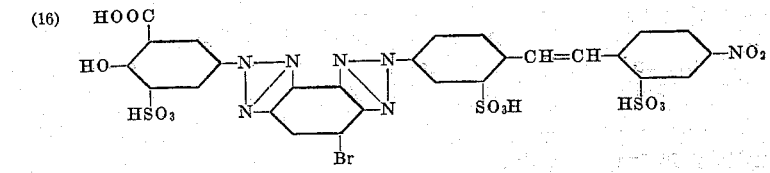

From St ⟶ 5-amino-2-(4'-hydroxy-3'-carboxy-5'-sulfophenyl)-6-brom-1:3-benztriazol

(17) 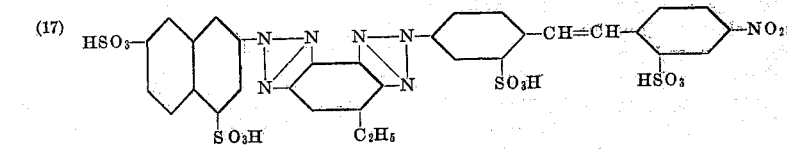

From St ⟶ 5-amino-2:2'-(4':8'-disulfonaphthyl)-6-ethyl-1:3-benztriazol

(18) 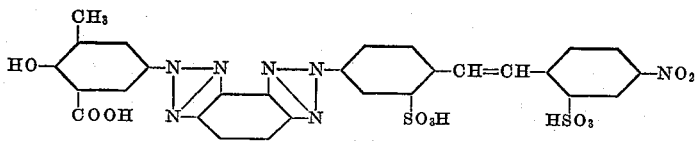

From St ⟶ 5-amino-2-(4'-hydroxy-3'-carboxy-5'-methylphenyl)-1:3-benztriazol

For the condensation with the nitrostilbene-bis-triazols any iso- or heterocyclic amines, especially those, whose condensation with nitrostilbene derivatives has become known, may be used such as 4-amino-4'-hydroxy-diphenyl-methane-3'-carboxylic acid, derivates of the 4-amino-diphenylamine, 2-(4'-hydroxy-3'-carboxy-5'-sulfo-phenyl)-5-amino-1:3-benztriazol, 2-[5'-hydroxy-7'-sulfonaphthyl-(2)]-5-amino-benztriazol, etc. Aminoazo dyestuffs of these groups, eventually also such ones, which contain the saponifiable acylamino groups and more particularly metallisable groups, may be particularly cited in this connection. Of course, any possibilities and variations known for the manufacture of nitrostilbene condensation products may be applied for the condensation and after-treatment. Thus may be mentioned for instance the condensation in presence or absence of pressure, the after-treatment with oxidising agents, with metal-yielding agents on the fibre or in substance and on the fibre respectively.

Moreover, there may especially be mentioned that it is possible to after-treat dyeings of metal complex compounds with the same metal or with another metal than that used for the formation of the complex compound.

The dyeings of the new dyestuffs onto cellulose fibres are generally distinguished by good fastness properties in the moist state and by a good to very good light-fastness. Moreover, in such cases, where the dyestuffs contain metallisable groups, the fastness properties in the moist state can still considerably be increased by an after-treatment with metal salts and more particularly with salts of copper and chromium.

The following examples, in which the parts are by weight, illustrate the invention without being limitative.

Example 1

40 parts of diazotised 4:4'-nitroaminostilbene-2:2'-disulfonic acid are coupled with 35 parts of 5-amino-2-(4'-hydroxy-3'-carboxyphenyl)-1:3-benztriazol. The red dyestuff is filtered off, dissolved in 3000 to 4000 parts of hot water with addition of ammonia and oxidised at 95–98° C. with a solution of 60 parts of crystallised copper sulfate and 120 parts of concentrated ammonia. The copper complex of the bis-triazol is split open by heating the same with hydrochloric acid. After isolation the nitrostilbene-bis-triazol is obtained in form of a yellow substance.

75.9 parts of the so obtained compound and 25.7 parts of 4-amino-4'-hydroxy-1:1'-azobenzene-3'-carboxylic acid are condensed under reflux at boiling temperature for 15–20 hours with 1600 parts of water and 400 parts of caustic soda lye of 36° Bé., neutralised with hydrochloric acid after cooling, precipitated by means of sodium chloride and filtered off. The dried dyestuff is a dark brown powder dissolving in water with a yellow coloration and dyeing cellulosic fibres in yellow shades. The good fastness properties to washing and to water of the dyeings thus produced can still further be improved by an after-treatment with chromium salts.

A dyestuff having similar properties is obtained by coupling 40 parts of diazotised 4:4'-nitro-aminostilbene-2:2'-disulfonic acid with 35 parts of 5-amino-2-(2'-hydroxy-3'-carboxy-5'-sulfo-phenyl)-1:3-benztriazol and oxidising with copper sulfate and ammonia or lead dioxide in order to produce the nitrostilbene-bis-triazol, the latter being finally condensed in the manner indicated above with 25.7 parts of 4-amino-4'-hydroxy-1:1'-azobenzene-3'-carboxylic acid.

Example 2

75.9 parts of the stilbene-bis-triazol (Formula 6) described in Example 1 and 32 parts of dehydrothio-p-toluidine-sulfonic acid are condensed under reflux for 18 hours in 1500 parts of water and 500 parts of caustic soda lye of 36° Bé. The difficultly soluble condensation product is filtered off and dried. The dyestuff constitutes a yellow powder dissolving in water with a yellow coloration and dyeing cellulosic fibres in yellow shades of good fastness properties to water, washing and to light. Since the dyestuff leaves wool practically completely white, it is particularly valuable also for the dyeing of half-wool. By an after-treatment with copper or chromium salts the fastness properties in the moist state are still improved.

Further similar dyestuffs are obtained by replacing the above stilbene-bis-triazol by stilbene-bis-triazols of the Formulae 5, 7, 8, 9 or 18.

Example 3

75.9 parts of the stilbene-bis-triazol (Formula 6) disclosed in Example 1 and 42 parts of 2-(4-aminophenyl)-(naphtho-1':2':4:5-triazol)-5':7'-disulfonic acid are condensed for 12 hours at 110–120° C. in a pressure vessel containing 1000 parts of water and 140 parts of caustic soda lye of 36° Bé. The condensation product is precipitated by means of sodium chloride, filtered off and dried. The dyestuff is a yellow powder, which dyes cellulosic fibres in yellow shades being distinguished by good fastness properties to washing and to water and by a very good light-fastness. By an after-treatment with chromium or copper salts the fastness properties in the moist state are still improved.

By treating the above dyestuff in an alkaline solution with sodium hypochlorite there will be obtained a product dyeing fibres in still somewhat purer yellow shades.

Further similar dyestuffs are obtained by substituting the 2-(4-aminophenyl)-(naphtho-1':2':4:5-triazol)-5':7'-disulfonic acid by one of the following naphtho-triazol compounds: 2-(4-aminophenyl)-(naphtho-1':2':4:5-triazol)-4'-sulfonic acid, 2-(4-aminophenyl)-(naphtho-1':2':4:5-triazol)-6'-sulfonic acid, 2-(4-aminophenyl)-(naphtho-1':2':4:5-triazol)-3':6'-disulfonic acid etc.

Example 4

75.9 parts of the stilbene-bis-triazol described in Example 1 (cf. Formula 6) and 25.8 parts of 4'-amino-2'-methoxy-2-hydroxy-1:1'-azobenzene-5-sulfamide are heated to boiling under reflux for 15-20 hours in 2000 parts of water and 450 parts of caustic soda lye of 36° Bé. and isolated in the usual manner. The dyestuff is a dark brown powder dissolving in water with a brown-red coloration and dyeing cellulosic fibres in brownish-red shades. By an after-treatment with copper salts bordeaux-red shades of good fastness properties to washing and to water as well as of a very good light-fastness are produced.

*Example 5*

When condensing 75.9 parts of the stilbene-bis-triazol made according to Example 1 (Formula 6) with 34.9 parts of the monoazo dyestuff obtainable from diazotised anthranilic acid and 2-amino-5-hydroxynaphthalene-7-sulfonic acid in 2000 parts of water and 500 parts of caustic soda lye of 36° Bé., there will be obtained, after isolation, a brown powder. This dyestuff dissolves in water with a red coloration and dyes cellulosic fibres in red shades. When after-coppered, a brown-red dyeing of good fastness properties to washing and to water as well as of a very good light-fastness is obtained.

By treating the dyestuff in substance with copper salts in a slightly acid medium the metallised dyestuff is produced in form of a dark brown powder. Cellulosic fibres will be dyed in brown-red shades. By an after-treatment with chromium salts brown-red shades of improved fastness properties in the moist state are obtained.

*Example 6*

75.9 parts of the stilbene-bis-triazol disclosed in Example 1 (Formula 6) are condensed in the usual manner with 41.6 parts of the azo dyestuff obtainable from 1-amino-4-acetyl-amino- or -4-nitrobenzene - 2 - carboxylic acid→1-(4'-sulfophenyl)-3-methyl-pyrazolone and saponified or reduced by means of sodium sulfide respectively, the condensation being carried out in 1700 parts of water and 300 parts of caustic soda lye of 36° Bé. Then the product is isolated. Thus a yellow-brown powder is obtained which dissolves in water with a yellow coloration. The dyestuff dyes cellulosic fibres in reddish-yellow shades becoming only slightly dull, when after-treated with copper salts, and being distinguished by good fastness properties to washing, water and to light.

The same dyestuff is also obtained by condensing the unsaponified monoazo dyestuff from diazotised 1-amino-4-acetylaminobenzene-2-carboxylic acid and 1-(4'-sulfophenyl)-3-methyl-pyrazolone in the above manner with the stilbene-bis-triazol.

*Example 7*

40 parts of diazotised 4:4'-nitroaminostilbene-2:2'-disulfonic acid are coupled with 25.4 parts of 5 - amino-2-(3'-carboxyphenyl)-1:3-benztriazol and oxidised in the conventional manner to the nitrostilbene-bis-triazol (Formula 2). This compound is a yellow powder dissolving in water with a slightly yellow coloration. 67.3 parts of this nitro compound and 32.9 parts of the monoazo dyestuff obtainable from diazotised 1-aminobenzene-2-carboxylic acid and 2-amino-5-hydroxy-naphthalene-7-sulfonic acid are condensed under reflux at boiling temperature for 15-20 hours in 1600 parts of water and 400 parts of caustic soda lye of 36° Bé., the resulting product being isolated in the usual manner. The dyestuff is a brown powder dissolving in water with a reddish-brown coloration and dyeing cellulosic fibres in brown-red shades. The fastness properties to light and in the moist state are increased by an after-treatment with copper salts.

*Example 8*

40 parts of 4:4'-nitroaminostilbene-2:2'-disulfonic acid are diazotised and coupled with 42 parts of 5-amino-2:2'-(4':8'-disulfonaphthyl)-1:3-benztriazol. The dyestuff is oxidised with an ammoniacal copper sulfate solution at 90° C. or with sodium hypochlorite at 35-40° C. in a slightly alkaline medium in order to produce the nitrostilbene-bis-triazol (Formula 11). The nitro compound is a canary-yellow powder dissolving in water with a slightly yellow coloration.

80.8 parts of this nitrostilbene-bis-triazol and 37.8 parts of the monoazo dyestuff obtainable from diazotised 2-amino-naphthalene-4:8-disulfonic acid and 1-amino-3-methylbenzene are condensed in the usual manner in 1700 parts of water and 300 parts of caustic soda lye of 36° Bé. and isolated. Thus an orange powder is obtained which dissolves in water with a yellow-orange coloration and dyes cellulosic fibres in yellow-orange shades of good fastness properties to washing, water and to light.

*Example 9*

40 parts of diazotised 4:4'-nitroaminostilbene-2:2'-disulfonic acid are coupled with 35 parts of 5 - amino-2-(4'-hydroxy-3'-carboxyphenyl) - 6-sulfo-1:3-benztriazol and the resulting azo dyestuff is oxidised in the usual manner to the nitrostilbene-bis-triazol (Formula 5). The nitro body is a yellow powder dissolving in water with a yellow coloration. When condensing 75.9 parts of this nitrostilbene-bis-triazol (Formula 5) with 33.6 parts of the azo dyestuff, obtainable from 1-amino-4-acetylamino- or -4-nitrobenzene-2-carboxylic acid→1-phenyl-3-methyl - 5 - pyrazolone and saponified or reduced by means of sodium sulfide respectively, in the usual manner in 1700 parts of water and 300 parts of sodium hydroxide of 36° Bé., a yellow dyestuff will be obtained after isolation. The product is a yellow powder dyeing cellulosic fibres in yellow shades. By an after-treatment with copper or chromium salts the good fastness properties to washing and to water can still further be improved.

A dyestuff with similar properties is obtained by condensing the nitrostilbene-bis-triazol (Formula 5) with 5-aminobenzoic acid-(2-azo-4)-[1-(4'-sulfophenyl)-3-methyl-5-pyrazolone].

When condensing the nitrostilbene-bis-triazol (Formula 5) with the monoazo dyestuff from diazotised 1-amino-2-benzoic acid and 2-amino-5-hydroxynaphthalene-7-sulfonic acid, a brown-red dyestuff will be obtained. The after-coppered dyeing possesses very good fastness properties to washing, water and to light.

*Example 10*

36.4 parts of 5-amino-2-(4'-hydroxy-3'-carboxy - 5' - sulfophenyl)-6-methyl-1:3-benztriazol are coupled with 40 parts of diazotised 4:4'-nitroaminostilbene-2:2'-disulfonic acid, the so-obtained aminoazo dyestuff being oxidised to the nitrostilbene-bis-triazol (Formula 12) in the above described manner. On condensation according to Example 9 with 5-aminobenzoic acid-(2-azo-4)-1-phenyl-3-methyl - 5 - pyrazolone a yellow substance is produced. The resulting dyestuff dissolves in water with a yellow coloration and dyes cellulosic fibres in yellow shades which, when after-treated with copper or chromium salts, are distinguished by a good washing- and water-fastness.

A similar dyestuff is obtained by condensing the nitrostilbene-bis-triazol (Formula 12) with 5-aminobenzoic acid-(2-azo-4)-[1-(4'-sulfophenyl)-3-methyl-5-pyrazolone]. If the nitrostilbene-bis-triazol (Formula 12) is condensed with the monoazo dyestuff obtainable from diazotised 1-amino-2-benzoic acid and 2-amino-5-hydroxy-naphthalene-7-sulfonic acid, a dyestuff is obtained which dyes cellulosic fibres, when after-coppered, in brown-red shades and possesses good fastness properties to light and in the moist state.

Example 11

40 parts of 4:4'-nitroaminostilbene-2:2'-disulfonic acid are coupled with 38.5 parts of 5-amino-2-(4'-hydroxy-3'-carboxy - 5' - sulfophenyl) - 6 - chloro-1:3-benztriazol and oxidised in the usual manner to the nitrostilbene-bis-triazol (Formula 13). 79.4 parts of the said nitrostilbene-bis-triazol are condensed at boiling temperature under reflux for 15-20 hours with 32.9 parts of the monoazo dyestuff obtainable from diazotised 1-amino-2-benzoic acid and 2-amino-5-hydroxy-naphthalene-7-sulfonic acid in 1600 parts of water and 400 parts of caustic soda lye of 36° Bé. Then the dyestuff is isolated. It is a brown powder dissolving in water with a reddish-brown coloration and dyeing cellulosic fibres in brown-red shades. By an after-treatment with copper salts the light-fastness and the fastness properties in the moist state are considerably increased.

A yellow dyestuff having similarly good fastness properties in the moist state may be obtained by condensing the above described nitrostilbene-bis-triazol (Formula 13) with 5-aminobenzoic acid-(2-azo-4)-1-phenyl-3-methyl-5-pyrazolone.

Example 12

42 parts of 5-amino-2:2'-(4':8'-disulfonaphthyl)-1:3-benztriazol are coupled with 40 parts of diazotised 4:4'-nitroaminostilbene-disulfonic acid and the obtained dyestuff is oxidised to the nitrostilbene-bis-triazol in the manner described in Example 8. 80.8 parts of this nitrostilbene-bis-triazol (Formula 11) are condensed as usual with 41.6 parts of 5-aminobenzoic acid-(2-azo-4)-[1-(4'-sulfophenyl)-3-methyl-5 - pyrazolone], the dyestuff being finally isolated. The same is a yellow-brown powder which dissolves in water with a yellow coloration and dyes cellulosic fibres in yellow shades. The fastness properties to washing and to water may be improved by an after-treatment with copper salts. When coppering in substance according to any one of the known methods the metallised dyestuff is obtained in form of a brownish-yellow powder dissolving in water with a yellow coloration and dyeing cellulosic fibres in clear yellow shades of good fastness properties to washing and to water and of a very good light-fastness.

In the following table further combinations being possible according to the present invention will be enumerated; in each case the nitro- and amino-components used for the condensation are indicated.

In connection with the above explanations it may be stated that the copper lakes can, of course, also be prepared in substance and not only on the fibre. In the former case partly very difficultly soluble products will be obtained.

| No. | nitrostilbene-bis-triazol compound of the formula | Amine or aminoazo dyestuff | shade of the dyeing on cellulose | after treatment of the dyeing with salts of— | shade of the after-treated dyeing |
|---|---|---|---|---|---|
| 1 | No. 8 | 4-amino-2-methoxy-1:1'-azobenzene-5'-sulfonic acid | orange-brown | Cu | red-brown. |
| 2 | do | 4-amino-2-methoxy-2'-hydroxy-5'-chloro-1:1-azobenzene | yellow-brown | Cu / Cr | } brown. |
| 3 | do | 1-amino-2-hydroxybenzene-5-sulfamide → 2-amino-5-hydroxynaphthalene-7-sulfonic acid | brown | Cu / Cr | } Do. |
| 4 | do | 1-amino-5-chlorobenzene-2-carboxylic acid → 2-amino-5-hydroxynaphthalene-7-sulfonic acid | red-brown | Cu / Cr | } Do. |
| 5 | do | 1-amino-4-acetylaminobenzene-2-carboxylic acid → 1-phenyl-3-methyl-5-pyrazolone saponified | yellow | Cu | yellow. |
| 6 | do | 1-aminonaphthalene-6-sulfonic acid → 1-amino-3-methyl-benzene | yellow-orange | Cr | yellow-orange. |
| 7 | do | 4-amino-2-methyl-5-methoxy-4'-hydroxy-3'-carboxy-1:1'-azobenzene-5'-sulfonic acid | orange | Cr / Cu | } orange. |
| 8 | do | 1-amino-4-hydroxybenzene-3-carboxylic acid → 1-amino-naphthalene | brown-red | Cr / Cu | brown-red. / brown-violet. |
| 9 | do | 4-amino-2-methoxy-4'-hydroxy-1:1'-azobenzene-3'-carboxylic acid | red-orange | Cr | brown-red. |
| 10 | No. 6 | 1-amino-2-hydroxybenzene-5-sulfamide → 2-amino-5-hydroxynaphthalene-7-sulfonic acid | brown | Cu / Cr | } brown. |
| 11 | do | 4:4'-amino-acetyl-amino-diphenyl → salicylic acid, saponified | yellow | Cr | yellow. |
| 12 | do | 1-amino-4-acetyl-aminobenzene-2-carboxylic acid → 2-phenyl-amino-5-hydroxynaphthalene-7-sulfonic acid, saponified | violet | Cu | grey-violet. |
| 13 | do | 1-amino-4-acetyl-aminobenzene-2-carboxylic acid → 1-phenyl-3-methyl-pyrazolone, saponified | yellow | Cu | yellow. |
| 14 | do | 4-amino-2-methyl-4'-hydroxy-3'-carboxy-1:1'-azobenzene-5'-sulfonic acid | yellow-orange | Cr / Cu | } yellow-orange. |
| 15 | do | 4-amino-2-methyl-5-methoxy-4'-hydroxy-3'-carboxy-1:1'-azobenzene-5'-sulfonic acid | orange | Cr / Cu | } orange. |
| 16 | do | 4-amino-2-methoxy-4'-hydroxy-1:1'-azobenzene-3'-carboxylic acid | do | Cr / Cu | orange. / red-orange. |
| 17 | No. 1 | 1-amino-4-acetyl-aminobenzene-2-carboxylic acid → 2-phenyl-amino-5-hydroxy-naphthalene-7-sulfonic acid, saponified | brownish-red | Cu | brown-red. |
| 18 | No. 3 | 4:4'-amino-acetylaminodiphenyl → salicylic acid, saponified | yellow | Cr | yellow. |
| 19 | do | 1-amino-4-hydroxy-benzene-3-carboxylic acid → 1-amino-naphthalene | orange-red | Cr / Cu | brown-orange. / violet-brown. |
| 20 | No. 4 | 2-(4-aminophenyl)-(naphtho-1':2':4:5-triazol)-5':7'-disulfonic acid | yellow | Cr | yellow. |
| 21 | No. 3 | 1-amino-4-acetylaminobenzene-2-carboxylic acid → 2-hydroxynaphthalene-3-carboxylic acid, saponified | reddish-brown | Cu | brown. |
| 22 | No. 5 | 1-amino-4-acetylaminobenzene-2-carboxylic acid → 1-(4'hydroxy-3'-carboxyphenyl)-5-pyrazolone-carboxylic acid-3, saponified | yellow | Cr / Cu | } yellow. |
| 23 | do | 2-(4-aminophenyl)-(naphtho-1':2':4:5-triazol)-4'-sulfonic acid | do | Cr / Cu | } Do. |
| 24 | do | 1-aminobenzene-2-carboxylic acid → 2-amino-5-hydroxy-naphthalene-7-sulfonic acid | brownish-red | Cu | red-brown. |
| 25 | No. 7 | 1-aminobenzene-2-carboxylic acid → 2-amino-5-hydroxy-naphthalene-7-sulfonic acid | do | Cu | Do. |
| 26 | No. 9 | dehydrothio-p-toluidine-sulfonic acid | yellow | Cr | yellow. |
| 27 | do | 1-amino-4-acetylaminobenzene-2-carboxylic acid → 1-phenyl-3-methyl-pyrazolone, saponified | do | Cu | Do. |

| No. | nitrostilbene-bis-triazol compound of the formula | Amine or aminoazo dyestuff | shade of the dyeing on cellulose | after treatment of the dyeing with salts of— | shade of the after-treated dyeing |
|---|---|---|---|---|---|
| 28 | No. 9 | 1-amino-4-acetylaminobenzene-2-carboxylic acid ⟶ 1-(4'-hydroxy-3'-carboxyphenyl)-3-methyl-5-pyrazolone, saponified | yellow | Cu / Cr | yellow. |
| 29 | do | 1-amino-4-acetylaminobenzene-2-carboxylic acid ⟶ 1-phenyl-pyrazolone-3-carboxylic acid, saponified | yellow-orange | Cu / Cr | yellow-orange. |
| 30 | No. 10 | 1-amino-5-chlorobenzene-2-carboxylic acid ⟶ 2-amino-5-hydroxynaphthalene-7-sulfonic acid | brown-red | Cu | brown. |
| 31 | do | 1-aminobenzene-2-carboxylic acid ⟶ 2-amino-5-hydroxynaphthalene-7-sulfonic acid | brownish-red | Cu | red-brown. |
| 32 | do | 1-amino-4-acetylaminobenzene-2-carboxylic acid ⟶ 1-(4'-sulfophenyl)-3-methyl pyrazolone, saponified | yellow | Cu | yellow. |
| 33 | No. 11 | dehydrothio-p-toluidine-sulfonic acid | do | | |
| 34 | do | 2-(4-aminophenyl)-(naphtho-1':2':4:5-triazol)-5':7'-disulfonic acid | do | | |
| 35 | No. 8 | 4'-amino-4-hydroxy-diphenylmethane-3-carboxylic acid | do | Cr / Cu | yellow. |
| 36 | do | 2-[5'-hydroxy-7'-sulfonaphthyl-(2)]-5-amino-benztriazol | yellow-orange | Cu / Cr | yellow-orange. |
| 37 | No. 11 | 2-(4'-hydroxy-3'-carboxy-5'-sulfophenyl)-5-amino-1:3-benztriazol | do | Cu / Cr | Do. |
| 38 | No. 13 | 1-amino-4-acetylaminobenzene-2-carboxylic acid ⟶ 1-phenyl-3-methyl-5-pyrazolone, saponified. | yellow | Cu / Cr | yellow. |
| 39 | No. 14 | 1-amino-4-acetylaminobenzene-2-carboxylic acid ⟶ 1-(4'-sulfophenyl)-3-methyl-5-pyrazolone, saponified. | do | Cu / Cr | Do. |
| 40 | No. 15 | 1-amino-4-acetylaminobenzene-2-carboxylic acid ⟶ 1-(4'-hydroxy-3'-carboxyphenyl)-5-pyrazolone-3-carboxylic acid, saponified. | yellow-orange | Cu / Cr | yellow-orange. |
| 41 | No. 16 | 1-amino-4-acetylaminobenzene-2-carboxylic acid ⟶ 1-(3'-carboxyphenyl)-3-methyl-5-pyrazolone, saponified. | yellow | Cu / Cr | yellow. |

| No. | nitrostilbene-bis-triazol compound: | amine | shade in chrome-printing |
|---|---|---|---|
| 42 | formula No. 7 | 4'-amino-4-hydroxy-3-carboxy-diphenyl-amine-2'-sulfonic acid | yellow-orange. |
| 43 | formula No. 8 | do | Do. |
| 44 | formula No. 7 | 4'-amino-diphenyl-amine-3:2'-disulfonic acid | Do. |
| 45 | do | 2-(4-aminophenyl)-(naphtho-1':2':4:5-triazol)-3:6:8-trisulfonic acid | Do. |

What we claim is:
1. Process for the manufacture of stilbene dyestuffs comprising condensing, in a caustic alkaline medium at elevated temperature, an aromatic amino compound with a nitrostilbene-bis-triazol of the general formula

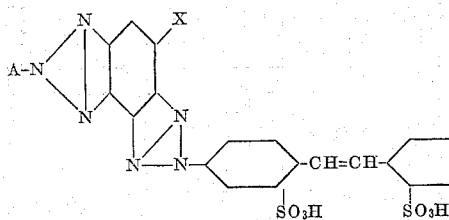

wherein A means a member selected from the group consisting of benzene and naphthalene radicals containing at least one group imparting solubility in water, and X means a member selected from the group consisting of H, $SO_3H$, COOH, halogen, alkyl and alkoxy.

2. Process for the manufacture of stilbene dyestuffs comprising condensing, in a caustic alkaline medium at elevated temperature, an aminoazo dyestuff with a nitrostilbene-bis-triazol of the general formula

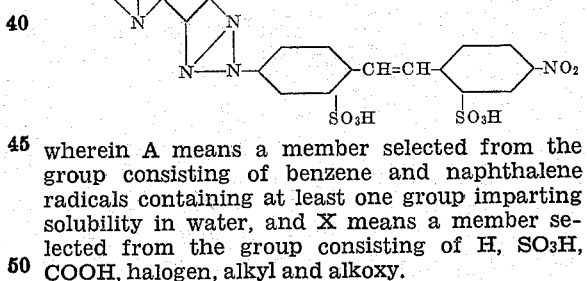

wherein A means a member selected from the group consisting of benzene and naphthalene radicals containing at least one group imparting solubility in water, and X means a member selected from the group consisting of H, $SO_3H$, COOH, halogen, alkyl and alkoxy.

3. Process for the manufacture of a stilbene dyestuff comprising condensing, in a caustic alkaline medium at elevated temperature, an aminoazo dyestuff of the formula

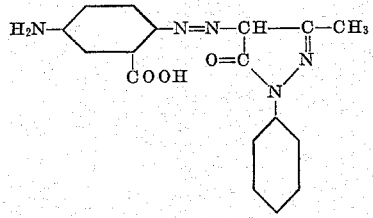

with a nitrostilbene-bis-triazol of the formula

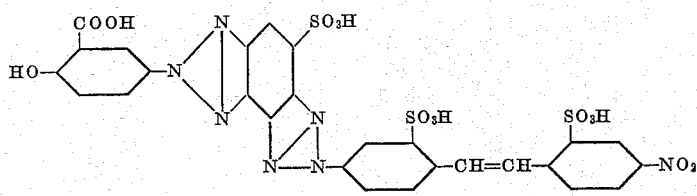

4. Process for the manufacture of a stilbene dyestuff comprising condensing, in a caustic alkaline medium at elevated temperature, an aminoazo dyestuff of the formula

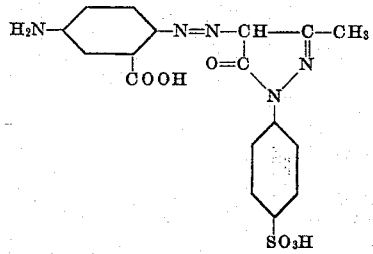

with a nitrostilbene-bis-triazol of the formula

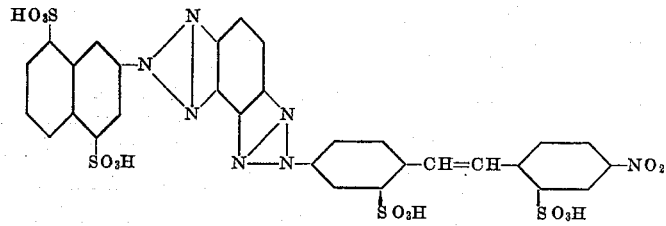

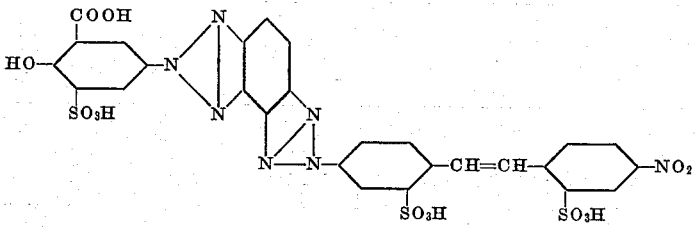

5. Process for the manufacture of a stilbene dyestuff comprising condensing, in a caustic alkaline medium at elevated temperature, an aminoazo dyestuff of the formula

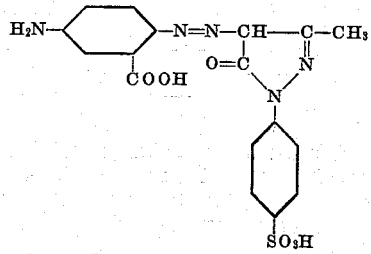

with a nitrostilbene-bis-triazol of the formula

6. The stilbene dyestuffs obtained according to the process claimed in claim 1.
7. The stilbene dyestuffs obtained according to the process claimed in claim 2.
8. The stilbene dyestuff obtained according to the process claimed in claim 3.
9. The stilbene dyestuff obtained according to the process claimed in claim 4.
10. The stilbene dyestuff obtained according to the process claimed in claim 5.

ERNST KELLER.
REINHARD ZWEIDLER.

REFERENCES CITED

The following references are of record in the file of this patent:

UNITED STATES PATENTS

| Number | Name | Date |
|---|---|---|
| 2,029,591 | Schindhelm et al. | Feb. 4, 1936 |
| 2,056,539 | Schindhelm et al. | Oct. 6, 1936 |
| 2,232,078 | Schindhelm | Feb. 18, 1941 |
| 2,248,151 | Winkeler et al. | July 8, 1941 |
| 2,270,451 | Keller | Jan. 20, 1942 |
| 2,385,862 | Keller | Oct. 2, 1945 |